United States Patent

Hoffman et al.

(10) Patent No.: US 7,099,429 B2
(45) Date of Patent: Aug. 29, 2006

(54) SCINTILLATOR ARRAYS FOR RADIATION DETECTORS AND METHODS OF MANUFACTURE

(75) Inventors: David Michael Hoffman, New Berlin, WI (US); Michael Fred Hoge, Waukesha, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 58 days.

(21) Appl. No.: 10/679,872

(22) Filed: Oct. 6, 2003

(65) Prior Publication Data

US 2005/0072930 A1  Apr. 7, 2005

(51) Int. Cl.
G01N 23/00 (2006.01)

(52) U.S. Cl. .................. 378/19; 378/98.8; 250/370.11; 250/368

(58) Field of Classification Search ............... 378/19, 378/98.8; 250/370.11, 368, 371
See application file for complete search history.

(56) References Cited

U.S. PATENT DOCUMENTS

| | | | |
|---|---|---|---|
| 4,417,144 A | 11/1983 | Hoffman et al. | |
| 4,491,732 A | 1/1985 | Pritzkow et al. | |
| 4,560,877 A | 12/1985 | Hoffman | |
| 4,563,584 A | 1/1986 | Hoffman et al. | |
| 5,773,829 A * | 6/1998 | Iwanczyk et al. | 250/367 |
| 6,087,665 A | 7/2000 | Hoffman et al. | |
| 6,115,448 A | 9/2000 | Hoffman | |
| 6,173,031 B1 | 1/2001 | Hoffman et al. | |
| 6,298,113 B1 * | 10/2001 | Duclos et al. | 378/19 |
| 6,344,649 B1 | 2/2002 | Riedner et al. | |
| 6,894,282 B1 * | 5/2005 | Freund et al. | 250/368 |
| 2003/0122083 A1 | 7/2003 | Possin et al. | |
| 2005/0104000 A1 * | 5/2005 | Kindem et al. | 250/361 R |

* cited by examiner

*Primary Examiner*—Edward J. Glick
*Assistant Examiner*—Jurie Yun
(74) *Attorney, Agent, or Firm*—Carl B. Horton, Esq.; Armstrong Teasdale LLP

(57) ABSTRACT

A method for fabricating a scintillator array for a radiation detector of an imaging system includes fabricating a scintillator array including a plurality of scintillators arranged side by side, each of the scintillators separated from adjacent scintillators such that a gap is defined therebetween, each of the scintillators having a geometric shape defined by a plurality of external surfaces, fabricating a pre-formed reflector having a plurality of cavities defined therein, each cavity having a geometric shape substantially similar to each scintillator geometric shape, and coupling the scintillator array and the pre-formed detector such that each respective scintillator is positioned at least partially within at least one respective reflector cavity.

17 Claims, 4 Drawing Sheets

SCINTILLATOR ARRAYS FOR RADIATION DETECTORS AND METHODS OF MANUFACTURE

BACKGROUND OF THE INVENTION

This invention relates generally to methods and apparatus for detecting radiation in a Computed Tomography (CT) imaging system, and more particularly to scintillator arrays used in a CT imaging system.

In at least some CT imaging system configurations, an x-ray source projects a fan-shaped beam that passes through the object being imaged, such as a patient. The beam, after being attenuated by the object, strikes and is detected by an array of radiation detectors. These radiation detectors typically include a collimator for collimating x-ray beams received at the detector, a scintillator that is adjacent to the collimator, and photodetectors that are adjacent to the scintillator.

At least one known detector array includes a two-dimensional array of scintillator cells, wherein each scintillator cell has an associated photodetector. When manufacturing these types of scintillator cells, an epoxy material is typically used to cast the scintillator cells into a block having specified dimensions. To facilitate reflectivity and to reduce cross-talk between adjacent detector cells, the cast reflector mixture includes a material that has a relatively high refractive index, such as $TiO_2$. Therefore, the cast reflector mixture facilitates confining light that is generated in the scintillating material by impinging x-rays within the detector cell in which it is generated. However, when a failure is detected within either the scintillator or the cast reflector mixture between the scintillators, the entire scintillator assembly may have to be replaced. Accordingly, casting the reflector mixture between the scintillators can result in an increase in the manufacturing costs of the imaging system.

BRIEF DESCRIPTION OF THE INVENTION

In one aspect, a method for fabricating a scintillator array for a radiation detector of an imaging system is provided. The method includes fabricating a scintillator array including a plurality of scintillators arranged side by side, each of the scintillators separated from adjacent scintillators such that a gap is defined therebetween, each of the scintillators having a geometric shape defined by a plurality of external surfaces, fabricating a pre-formed reflector having a plurality of cavities defined therein, each cavity having a geometric shape substantially similar to each scintillator geometric shape, and coupling the scintillator array and the pre-formed reflector such that each respective scintillator is positioned at least partially within at least one respective reflector cavity.

In another aspect, a radiation detector is provided. The radiation detector includes a scintillator array including a plurality of scintillators arranged side by side, each of the scintillators separated from adjacent scintillators such that a gap is defined therebetween, each of the scintillators having a geometric shape defined by a plurality of external surfaces, and a pre-formed reflector including a plurality of cavities defined therein, each cavity having a geometric shape substantially similar to each scintillator geometric shape, the scintillator array coupled to the pre-formed reflector such that each respective scintillator is positioned at least partially within at least one respective reflector cavity.

In a further aspect, a computed tomography (CT) imaging system is provided. The CT imaging system includes a radiation source, a radiation detector including a scintillator array including a plurality of scintillators arranged side by side, each of the scintillators separated from adjacent scintillators such that a gap is defined therebetween, each of the scintillators having a geometric shape defined by a plurality of external surfaces, and a pre-formed reflector including a plurality of cavities defined therein, each cavity having a geometric shape substantially similar to each scintillator geometric shape, the scintillator array coupled to the pre-formed reflector such that each respective scintillator is positioned at least partially within at least one respective reflector cavity, and a computer operationally coupled to the radiation source and the radiation detector.

DETAILED DESCRIPTION OF THE INVENTION

Figure 1:
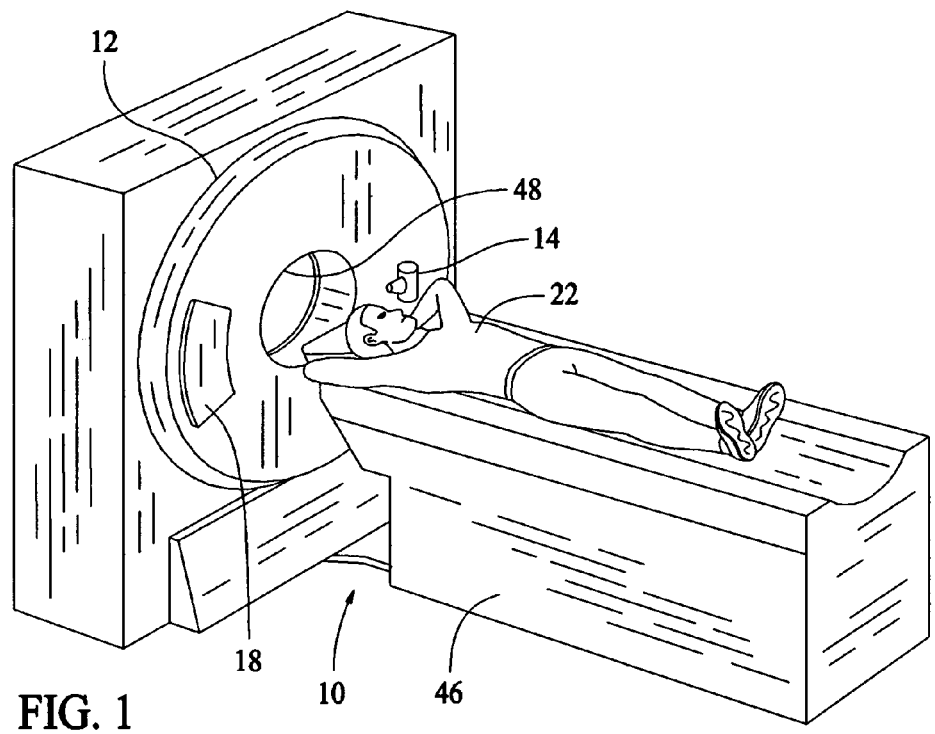
FIG. 1 is a pictorial view of a CT imaging system embodiment.

There is herein provided scintillator arrays and methods for fabricating scintillator arrays useful for Imaging Systems such as, for example, but not limited to, a Computed Tomography (CT) System. The apparatus and methods are illustrated with reference to the figures wherein similar numbers indicate the same elements in all figures. Such figures are intended to be illustrative rather than limiting and are included herewith to facilitate explanation of an exemplary embodiment of the apparatus and methods of the invention.

In some known CT imaging system configurations, a radiation source projects a fan-shaped beam which is collimated to lie within an X-Y plane of a Cartesian coordinate system and generally referred to as an "imaging plane". The radiation beam passes through an object being imaged, such as a patient. The beam, after being attenuated by the object, impinges upon an array of radiation detectors. The intensity of the attenuated radiation beam received at the detector array is dependent upon the attenuation of a radiation beam by the object. Each detector element of the array produces a separate electrical signal that is a measurement of the beam attenuation at the detector location. The attenuation measurements from all the detectors are acquired separately to produce a transmission profile.

In third generation CT systems, the radiation source and the detector array are rotated with a gantry within the imaging plane and around the object to be imaged such that an angle at which the radiation beam intersects the object constantly changes. A group of radiation attenuation measurements, i.e., projection data, from the detector array at one gantry angle is referred to as a "view". A "scan" of the object includes a set of views made at different gantry angles, or view angles, during one revolution of the radiation source and detector.

In an axial scan, the projection data is processed to reconstruct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a display device.

To reduce the total scan time, a "helical" scan may be performed. To perform a "helical" scan, the patient is moved while the data for the prescribed number of slices is acquired. Such a system generates a single helix from a fan beam helical scan. The helix mapped out by the fan beam yields projection data from which images in each prescribed slice may be reconstructed.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Also as used herein, the phrase "reconstructing an image" is not intended to exclude embodiments of the present invention in which data representing an image is generated but a viewable image is not. Therefore, as used herein the term, "image," broadly refers to both viewable images and data representing a viewable image. However, many embodiments generate (or are configured to generate) at least one viewable image.

Figure 2:
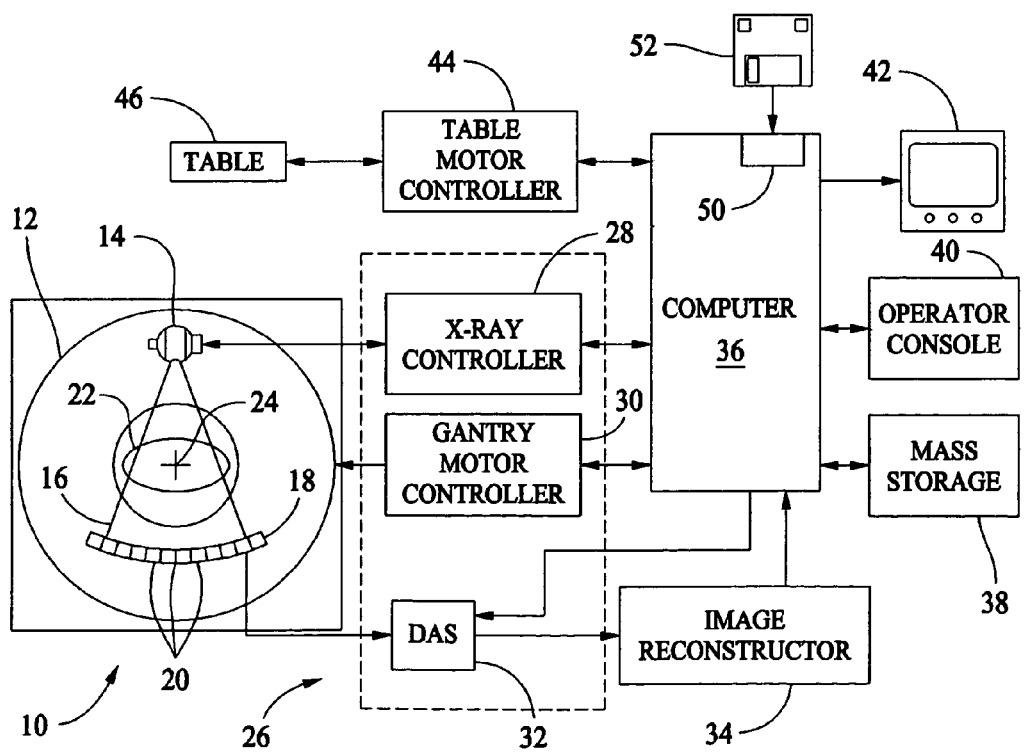
FIG. 2 is a block schematic diagram of the system illustrated in FIG. 1.

FIG. 1 is a pictorial view of a CT imaging system 10. FIG. 2 is a block schematic diagram of system 10 illustrated in FIG. 1. In the exemplary embodiment, a computed tomography (CT) imaging system 10, is shown as including a gantry 12 representative of a "third generation" CT imaging system. Gantry 12 has a radiation source 14 that projects a cone beam 16 of X-rays toward a detector array 18 on the opposite side of gantry 12.

Detector array 18 is formed by a plurality of detector rows (not shown in FIGS. 1 and 2) including a plurality of detector elements 20 which together sense the projected X-ray beams that pass through an object, such as a medical patient 22. Each detector element 20 produces an electrical signal that represents the intensity of an impinging radiation beam and hence the attenuation of the beam as it passes through object or patient 22. An imaging system 10 having a multislice detector 18 is capable of providing a plurality of images representative of a volume of object 22. Each image of the plurality of images corresponds to a separate "slice" of the volume. The "thickness" or aperture of the slice is dependent upon the thickness of the detector rows.

During a scan to acquire radiation projection data, gantry 12 and the components mounted thereon rotate about a center of rotation 24. FIG. 2 shows only a single row of detector elements 20 (i.e., a detector row). However, multislice detector array 18 includes a plurality of parallel detector rows of detector elements 20 such that projection data corresponding to a plurality of quasi-parallel or parallel slices can be acquired simultaneously during a scan.

Rotation of gantry 12 and the operation of radiation source 14 are governed by a control mechanism 26 of CT system 10. Control mechanism 26 includes a radiation controller 28 that provides power and timing signals to radiation source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized radiation data from DAS 32 and performs high-speed image reconstruction. The reconstructed image is applied as an input to a computer 36 which stores the image in a mass storage device 38.

Computer 36 also receives commands and scanning parameters from an operator via a console 40 that has a keyboard. An associated display 42 allows the operator to observe the reconstructed image and other data from computer 36. The operator supplied commands and parameters are used by computer 36 to provide control signals and information to DAS 32, radiation controller 28, and gantry motor controller 30. In addition, computer 36 operates a table motor controller 44 which controls a motorized table 46 to position patient 22 in gantry 12. Particularly, table 46 moves portions of patient 22 through gantry opening 48.

In one embodiment, computer 36 includes a device 50, for example, a floppy disk drive, CD-ROM drive, DVD drive, magnetic optical disk (MOD) device, or any other digital device including a network connecting device such as an Ethernet device for reading instructions and/or data from a computer-readable medium 52, such as a floppy disk, a CD-ROM, a DVD or an other digital source such as a network or the Internet, as well as yet to be developed digital means. In another embodiment, computer 36 executes instructions stored in firmware (not shown). Generally, a processor in at least one of DAS 32, reconstructor 34, and computer 36 shown in FIG. 2 is programmed to execute the processes described below. Of course, the method is not limited to practice in CT system 10 and can be utilized in connection with many other types and variations of imaging systems. In one embodiment, Computer 36 is programmed to perform functions described herein, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Although the herein described methods are described in a medical setting, it is contemplated that the benefits of the invention accrue to non-medical imaging systems such as those systems typically employed in an industrial setting or a transportation setting such as, for example, but not limited to, a baggage scanning CT system for an airport or other transportation center.

Figure 3:
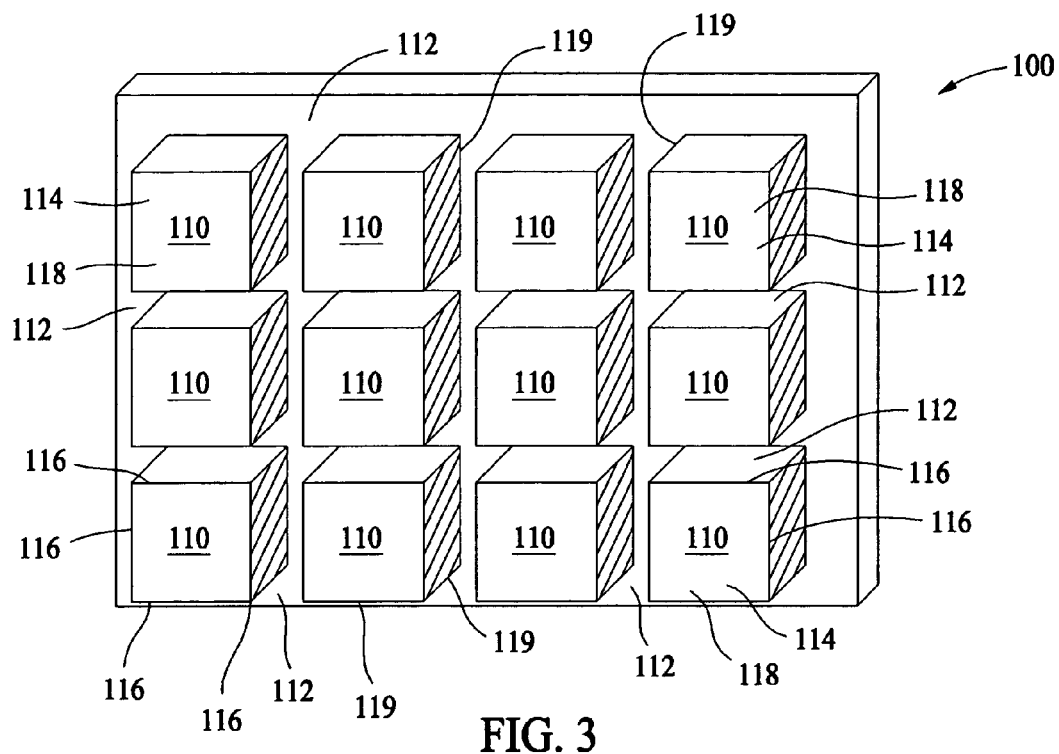
FIG. 3 is a portion of an exemplary two-dimensional diced scintillator array that can be used with the detector array shown in FIG. 1.
Figure 4:
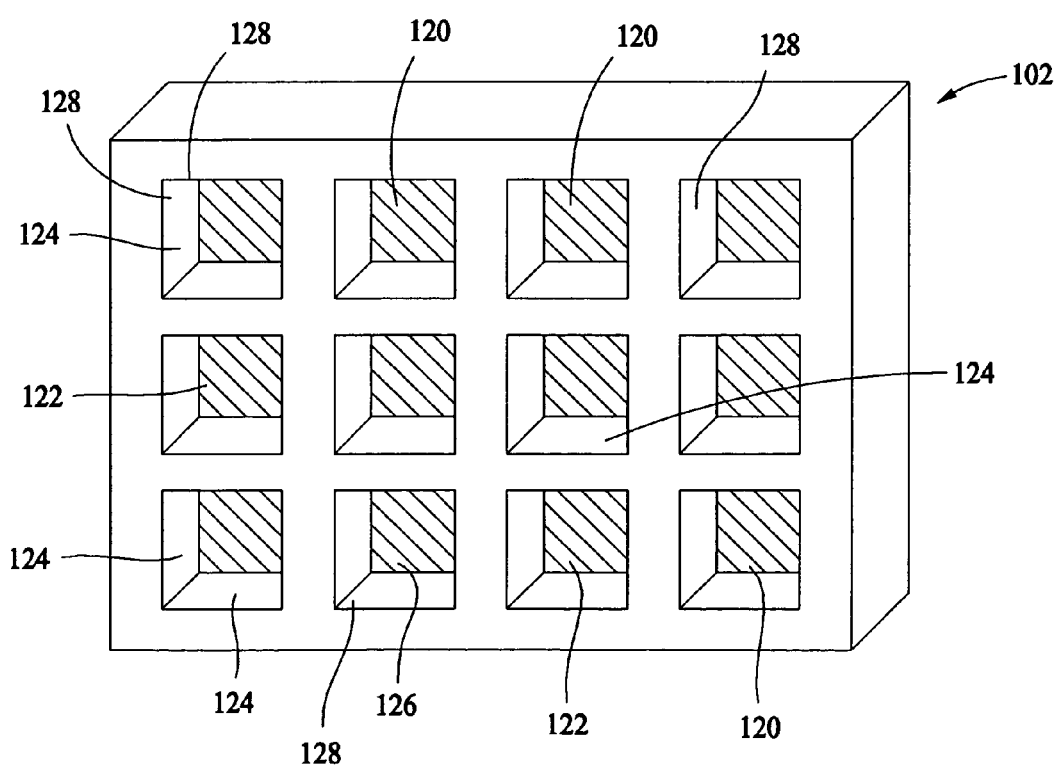
FIG. 4 is a portion of an exemplary pre-formed reflector that can be used with the diced scintillator array shown in FIG. 3.

FIG. 3 is a portion of a two-dimensional diced scintillator array 100 that can be used with detector array 18 (shown in FIG. 1). FIG. 4 is a portion of a pre-formed reflector 102 that can be used with diced scintillator array 100 (shown in FIG. 3). Array 100 includes a plurality of scintillators 110 arranged in a side by side configuration such that a non-scintillating gap 112 is defined therebetween. Each scintillator 110 includes a geometric shape 114 defined by a plurality of external surfaces 116. Specifically, each scintillator 110 has a geometric shape 114 which is defined by a top surface 118 and plurality of side surfaces 119. In the exemplary embodiment, external surfaces 116 define a substantially square shape. In another exemplary embodiment, external surfaces 116 define a shape different than the substantially square shape. In the exemplary embodiment, scintillators 110 are formed by using known geometric cutting methods to cut scintillators 110 into a block of scintillator material. Scintillators 110 can also be formed with other near net shape processes such as injection molding.

Pre-formed reflector 102 includes a plurality of cavities 120 defined therein arranged in a side by side configuration substantially similar to array 100. Each cavity 120 includes a geometric shape 122 substantially similar to each scintillator geometric shape 114, such that each scintillator 110 is configured to be positioned at least partially within at least one respective reflector cavity 120. In the exemplary embodiment, a plurality of external surfaces 124 define a substantially square shape. For example, each cavity 120 has a geometric shape which is defined by a bottom surface 126 and plurality of side surfaces 128. In another exemplary embodiment, external surfaces 124 define a shape different than the substantially square shape.

Pre-formed reflector 102 is fabricated using at least one of a thermo set material or a thermo plastic material. As used herein, a thermo set material is defined as a liquid resin that reacts with a catalyst to form a solid material. More specifically, thermo set resin is initially in liquid form, but is converted to a solid form when heat is applied. Generally, thermo set resins cannot be converted back to liquid form without destroying it. A thermo plastic is defined as a liquid that is converted to a solid, but can be converted back to liquid form by applying heat. Accordingly, pre-formed reflector 102 is fabricated as a separate component including external surfaces 124 and a bottom surface 126, such that scintillator surfaces 116 and top surface 118 are surrounded by the thermo set or thermo plastic material. In the exemplary embodiment, the thermo set or thermo plastic material includes a reflective material such as, but not limited to, a titanium dioxide material, and an optical inhibiting material such as, but not limited to a chromium oxide. Adding titanium dioxide to the thermo set or thermo plastic material facilitates increasing the reflectivity of the pre-formed reflector 102, whereas adding the optical inhibiting material to pre-formed reflector 102 facilitates reducing optical crosstalk between scintillators 110.

Figure 5:
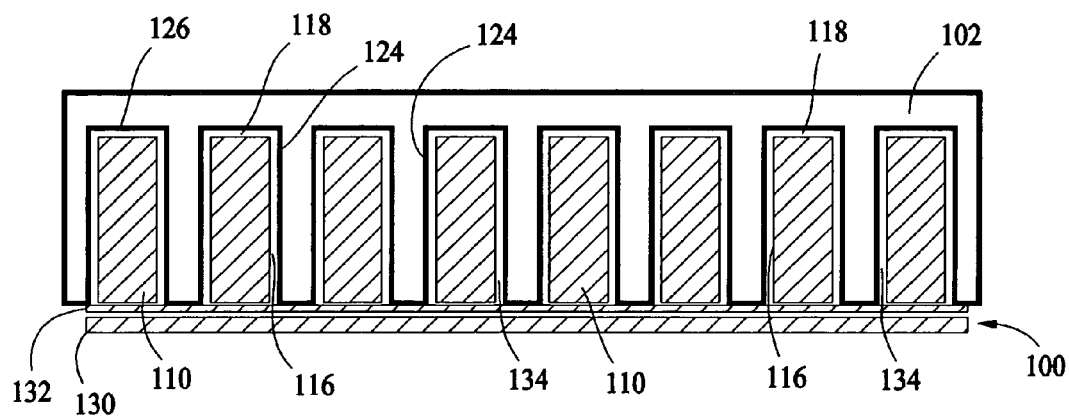
FIG. 5 is a side view of the diced scintillator array shown in FIG. 3 and the pre-formed reflector shown in FIG. 4.

FIG. 5 is a side view of the diced scintillator array 100 (shown in FIG. 3) and the pre-formed reflector (shown in FIG. 4). In use, scintillators 110 are bonded to an optical coupler 130 which is then bonded to a two-dimensional diode array 132 as known in the art. Pre-formed reflector 102 is then bonded to scintillator array 100 such that each scintillator 110 is positioned at least partially within at least one respective reflector cavity 120. In one embodiment, pre-formed reflector 102 is fabricated using a thermo set material and bonded to scintillator array 100 using an adhesive 134, for example. In another embodiment, pre-formed reflector 102 is fabricated using a thermo plastic material. Pre-formed reflector 102 is then positioned such that each respective scintillator 110 is positioned at least partially within at least one respective reflector cavity 120. Pre-formed reflector 102 is then bonded to scintillator array 100 using heat treatment and pressure.

Figure 6:
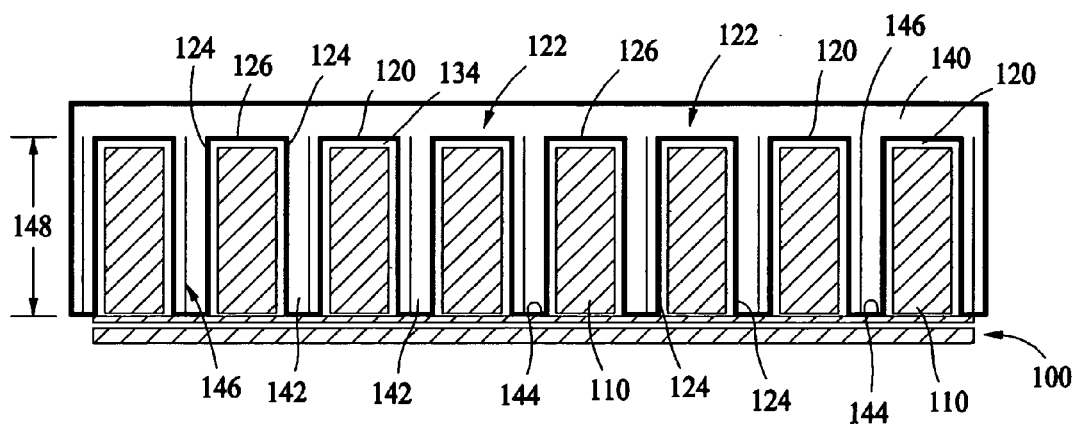
FIG. 6 is a side view of the diced scintillator array shown in FIG. 3 and another exemplary pre-formed reflector that can be used with the diced scintillator array shown in FIG. 3.

FIG. 6 is a side view of the diced scintillator array 100 (shown in FIG. 3) and another exemplary pre-formed reflector 140 that can be used with scintillator array 100. Pre-formed reflector 140 is substantially similar to pre-formed reflector 102, (shown in FIG. 4) and components in pre-formed reflector 140 that are identical to components of pre-formed reflector 102 are identified in FIG. 6 using the same reference numerals used in FIG. 4. Pre-formed reflector 140 includes a plurality of cavities 120 defined therein arranged in a side by side configuration substantially similar to array 100. Each cavity 120 includes a geometric shape 122 substantially similar to each scintillator geometric shape 114, such that each scintillator 110 is configured to be positioned at least partially within at least one respective reflector cavity 120. For example, each cavity 120 has a geometric shape which is defined by a bottom surface 126 and plurality of side surfaces 128. Accordingly, reflector 140 includes a plurality of projections 142 defined by external surfaces 124 and a plurality of surfaces 144, wherein each respective projection 142 extends at least partially into each respective 112 gap (shown in FIG. 3).

In one embodiment, pre-formed reflector 140 is fabricated using at least one of a thermo set material or a thermo plastic material. In the exemplary embodiment, pre-formed reflector 140 includes titanium dioxide to facilitate increasing the reflectivity of pre-formed reflector 140. Pre-formed reflector 140 also includes a plurality of interstitial plates 146, wherein each respective projection 142 includes a single interstitial plate 146 positioned approximately halfway between external surfaces 124. Interstitial plates 146 include a length 148 extending from surface 144 to bottom surface 126 approximately. In the exemplary embodiment, interstitial plates 146 are fabricated from a material such as, but not limited to, tungsten, tantalum, molybdenum, and lead to facilitate reducing scintillator to scintillator x-ray and optical crosstalk.

In one embodiment, pre-formed reflector 140 is fabricated using a thermo set material and bonded to scintillator array 100 using adhesive 134, for example. In another embodiment, pre-formed reflector 140 is fabricated using a thermo plastic material. Pre-formed reflector 140 is then positioned such that each respective scintillator 110 is positioned at least partially within at least one respective reflector cavity 120. Pre-formed reflector 140 is then heat treated to bond pre-formed reflector 140 to scintillator array 100.

Figure 7:
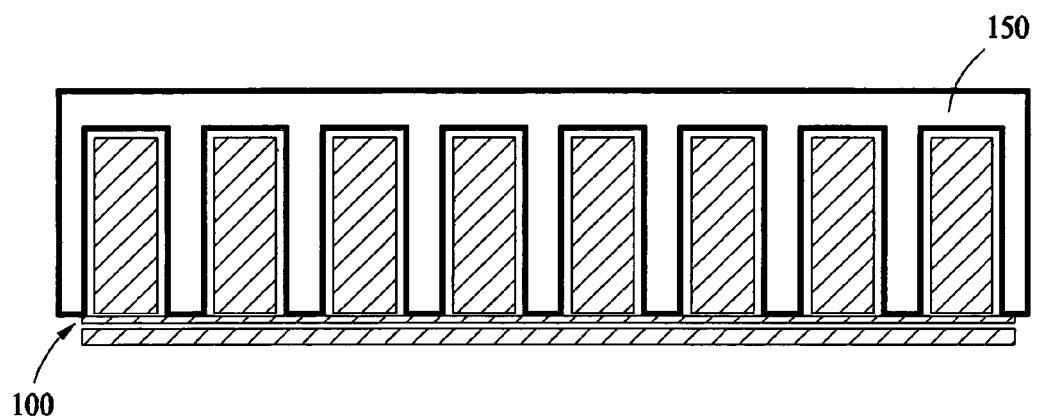
FIG. 7 is a side view of the diced scintillator array shown in FIG. 3 and another exemplary pre-formed reflector that can be used with the diced scintillator array shown in FIG. 3.

FIG. 7 is a side view of the diced scintillator array 100 (shown in FIG. 3) and another exemplary pre-formed reflector 150 that can be used with scintillator array 100. Pre-formed reflector 150 is substantially similar to pre-formed reflector 102, (shown in FIG. 4) and components in pre-formed reflector 150 that are identical to components of pre-formed reflector 102 are identified in FIG. 7 using the same reference numerals used in FIG. 4.

Pre-formed reflector 150 is fabricated using at least one of a thermo set material including or a thermo plastic material. In one embodiment, reflector 150 is fabricated using a thermo set material including a reflective powder such as, but not limited to titanium dioxide, and an optical inhibiting material such as, but not limited to chromium oxide. In another embodiment, pre-formed reflector 150 includes at least one of a dense powder and a material having an interstitial high atomic number such as, but not limited to, tungsten oxide, tantalum oxide, molybdenum oxide, and lead oxide. In another embodiment, reflector 150 is fabricated using a thermo plastic material including at least one of a dense powder and a material having an interstitial high atomic number such as, but not limited to, tungsten oxide, tantalum oxide, molybdenum oxide, and lead oxide. Pre-formed reflector 150 is coupled to array 100 as described previously herein. In operation, combining the material having an interstitial high atomic number with the thermo set or thermo plastic material facilitates reducing scintillator to scintillator x-ray and optical crosstalk while also increasing reflectivity.

Figure 8:
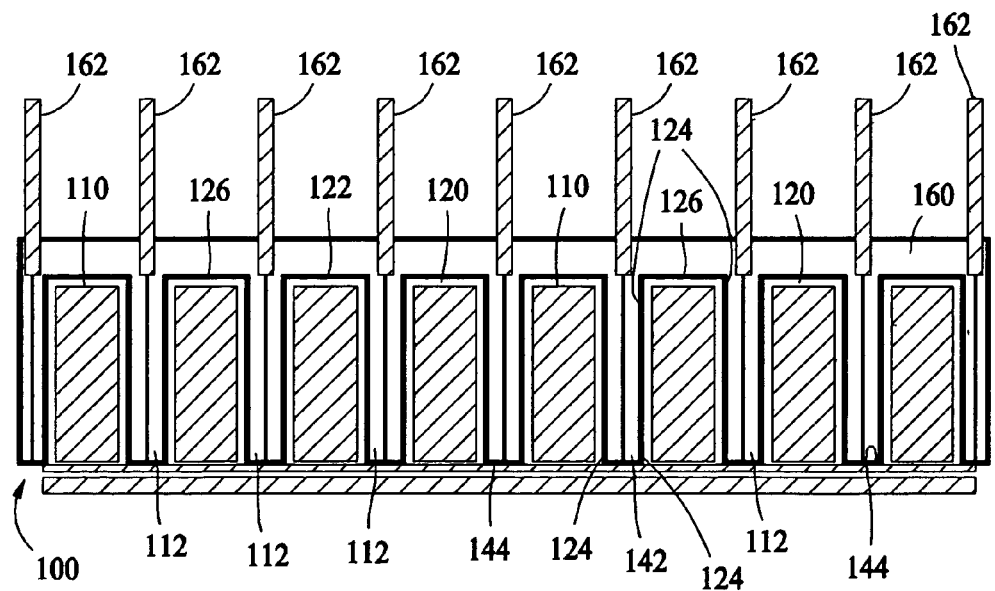
FIG. 8 is a side view of the diced scintillator array shown in FIG. 3 and another exemplary pre-formed reflector that can be used with the diced scintillator array shown in FIG. 3.

FIG. 8 is a side view of the diced scintillator array 100 (shown in FIG. 3) and another exemplary molded reflector 160 that can be used with scintillator array 100. Pre-formed reflector 160 is substantially similar to pre-formed reflector 140, (shown in FIG. 6) and components in pre-formed reflector 160 that are identical to components of pre-formed reflector 140 are identified in FIG. 8 using the same reference numerals used in FIG. 6. Pre-formed reflector 160 includes a plurality of cavities 120 defined therein arranged in a side by side configuration substantially similar to array 100. Each cavity 120 includes a geometric shape 122 substantially similar to each scintillator geometric shape 114, such that each scintillator 110 is configured to be positioned at least partially within at least one respective reflector cavity 120. For example, each cavity 120 has a geometric shape which is defined by a bottom surface 126 and plurality of side surfaces 128. Accordingly, reflector 160 includes a plurality of projections 142 defined by external surfaces 124 and a plurality of surfaces 144, wherein each respective projection 142 extends at least partially into each respective 112 gap (shown in FIG. 3).

In one embodiment, pre-formed reflector 160 is fabricated using at least one of a thermo set material or a thermo plastic material. Each projection 142 includes an interstitial plate 146 positioned approximately halfway between external surfaces 124. Interstitial plate 146 includes a length 148 extending from surface 144 to bottom surface 126 approximately. Pre-formed reflector 160 further includes a plurality of collimator plates 162 pre-formed integrally into reflector 160. In the exemplary embodiment, each respective collimator 162 is formed unitarily with each respective plate 146. In another embodiment, collimators 162 are formed separately from plates 146, and positioned at a first end 164 of plates 146. Pre-formed reflector 160 is coupled to array 100 as described previously herein. Collimators 162 are fabricated from an x-ray absorption material such as, but not limited to, tungsten, tantalum, molybdenum, or lead, to facilitate making X-rays parallel, which thereby substantially eliminates a peripheral, or more divergent, scattered portion of an x-ray beam. tungsten, tantalum, molybdenum, or lead The above-described pre-formed reflectors are cost-effective and highly reliable. Pre-formed reflectors are fabricated as a separate unit and coupled to a scintillator array using an adhesive for example. Additionally, the pre-formed reflectors are fabricated from at least one of a thermo set or thermo plastic material which can easily be configured to couple to a wide variety of scintillator arrays having different shapes and sizes. As a result, the relatively small quantity of parts used to fabricate the pre-formed reflectors can result in a decrease in the cost, weight, and manufacturing complexity of the detector assembly.

Exemplary embodiments of pre-formed reflectors are described above in detail. The pre-formed reflectors are not limited to the specific embodiments described herein, but rather, components of each assembly may be utilized independently and separately from other components described herein. For example, the collimators described in FIG. 8 can be used with the pre-formed reflector described in FIG. 4.

While the invention has been described in terms of various specific embodiments, those skilled in the art will recognize that the invention can be practiced with modification within the spirit and scope of the claims.

What is claimed is:

1. A method for fabricating a scintillator array for a radiation detector of an imaging system, said method comprising:
   fabricating a scintillator array including a plurality of scintillators arranged side by side, each of the scintillators separated from adjacent scintillators such that a gap is defined therebetween, each of the scintillators having a geometric shape defined by a plurality of external surfaces;
   fabricating a pre-formed molded reflector having a plurality of cavities defined therein, each cavity having a geometric shape substantially similar to each scintillator geometric shape the pre-formed reflector fabricated from at least one of a thermo set material and a thermo plastic material, the thermo set and thermo plastic material each including at least one of a titanium dioxide, a tungsten oxide material, a tantalum oxide material, a molybdenum oxide material, and a lead oxide material; and
   coupling the scintillator array and the pre-formed reflector such that each respective scintillator is positioned at least partially within at least one respective reflector cavity.

2. A method in accordance with claim 1 further comprising fabricating a pre-formed reflector from at least one of a thermo set material and a thermo plastic material, wherein the thermo set material and a thermo plastic material include at least one of a titanium dioxide and a chrome oxide.

3. A method in accordance with claim 1 further comprising coupling the scintillator array and the pre-formed reflector using an adhesive material.

4. A method in accordance with claim 1 further comprising fabricating a pre-formed reflector including a titanium dioxide and a plurality of interstitial plates formed integrally with the pre-formed reflector, the interstitial plates including at least one of a tungsten material, a tantalum material, a molybdenum material, and a lead material.

5. A method in accordance with claim 1 further comprising fabricating a pre-formed reflector including a plurality of collimators formed integrally with the pre-formed reflector.

6. A method in accordance with claim 1 further comprising fabricating a pre-formed reflector including a plurality of collimators and a plurality of interstitial plates formed integrally with the pre-formed reflector.

7. A radiation detector comprising:
   a scintillator array comprising a plurality of scintillators arranged side by side, each of said scintillators separated from adjacent scintillators such that a gap is defined therebetween, each of said scintillators having a geometric shape defined by a plurality of external surfaces; and
   a pre-formed molded reflector fabricated from at least one of a thermo set material and a thermo plastic material, the thermo set and thermo plastic material each including at least one of a titanium dioxide, a tungsten oxide material, a tantalum oxide material, a molybdenum oxide material, and a lead oxide material, said reflector comprising a plurality of cavities defined therein, each said cavity having a geometric shape substantially similar to each said scintillator geometric shape, said scintillator array coupled to said pre-formed reflector such that each said respective scintillator is positioned at least partially within at least one respective reflector cavity.

8. A radiation detector in accordance with claim 7 wherein said pre-formed reflector comprises at least one of a thermo set material and a thermo plastic material, said thermo set material and said thermo plastic material comprising at least one of a titanium dioxide and a chrome oxide.

9. A radiation detector in accordance with claim 7 further comprising an adhesive material positioned between said scintillator array and said pre-formed reflector, said adhesive configured to couple said scintillator array and said pre-formed reflector.

10. A radiation detector in accordance with claim 8 wherein said pre-formed reflector further comprises a titanium dioxide and a plurality of interstitial plates formed integrally with said pre-formed reflector, said interstitial plates comprising at least one of a tungsten material, a tantalum material, a molybdenum material, and a lead material.

11. A radiation detector in accordance with claim 8 wherein said pre-formed reflector further comprises a plurality of collimators formed integrally with said pre-formed reflector.

12. A radiation detector in accordance with claim 8 wherein said pre-formed reflector further comprises a plurality of collimators and a plurality of interstitial plates formed integrally with said pre-formed reflector.

13. A computed tomography (CT) imaging system comprising:
a radiation source;
a radiation detector comprising:
a scintillator array comprising a plurality of scintillators arranged side by side, each of said scintillators separated from adjacent scintillators such that a gap is defined therebetween, each of said scintillators having a geometric shape defined by a plurality of external surfaces; and
a pre-formed molded reflector fabricated from at least one of a thermo set material and a thermo plastic material, the thermo set and thermo plastic material each including at least one of a titanium dioxide, a tungsten oxide material, a tantalum oxide material, a molybdenum oxide material, and a lead oxide material, said reflector comprising a plurality of cavities defined therein, each said cavity having a geometric shape substantially similar to each said scintillator geometric shape, said scintillator array coupled to said pre-formed reflector such that each said respective scintillator is positioned at least partially within at least one respective reflector cavity; and
a computer operationally coupled to said radiation source and said radiation detector.

14. A CT imaging system in accordance with claim 13 wherein said pre-formed reflector comprises at least one of a thermo set material and a thermo plastic material, said thermo set material and said thermo plastic material comprising at least one of a titanium dioxide and a chrome oxide.

15. A CT imaging system in accordance with claim 13 wherein said pre-formed reflector further comprises a titanium dioxide and a plurality of interstitial plates formed integrally with said pre-formed reflector, said interstitial plates comprising at least one of a tungsten material, a tantalum material, a molybdenum material, and a lead material.

16. A CT imaging system in accordance with claim 13 wherein said pre-formed reflector further comprises a plurality of collimators formed integrally with said pre-formed reflector.

17. A CT imaging system in accordance with claim 13 wherein said pre-formed reflector further comprises a plurality of collimators and a plurality of interstitial plates formed integrally with said pre-formed reflector.

* * * * *